United States Patent
Peng

(10) Patent No.: US 7,156,417 B2
(45) Date of Patent: Jan. 2, 2007

(54) AUTOMOTIVE SIDE IMPACT PROTECTION

(75) Inventor: Zheng James Peng, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 432 days.

(21) Appl. No.: 10/605,777

(22) Filed: Oct. 25, 2003

(65) Prior Publication Data

US 2005/0087965 A1 Apr. 28, 2005

(51) Int. Cl.
*B60J 1/00* (2006.01)
*B60J 5/04* (2006.01)
*B60R 21/04* (2006.01)
*B60R 21/21* (2006.01)

(52) U.S. Cl. ............... 280/730.2; 280/751; 49/502; 296/187.05; 296/201; 296/146.16

(58) Field of Classification Search ............ 280/730.2, 280/751; 296/146.2, 187.05, 202, 146.16, 296/201; 49/502

See application file for complete search history.

(56) References Cited

U.S. PATENT DOCUMENTS

| 5,318,145 | A | * | 6/1994 | Vollmer | 180/274 |
| 5,632,835 | A | * | 5/1997 | Niwa et al. | 156/99 |
| 5,979,932 | A | * | 11/1999 | Jourdaine et al. | 280/730.2 |
| 6,261,672 | B1 | * | 7/2001 | de Paoli | 428/213 |
| 6,378,896 | B1 | * | 4/2002 | Sakakida et al. | 280/730.2 |
| 6,720,082 | B1 | * | 4/2004 | Hashimoto et al. | 428/437 |
| 6,976,727 | B1 | * | 12/2005 | Omori | 296/146.16 |
| 2005/0057024 | A1 | * | 3/2005 | Weston et al. | 280/730.2 |

FOREIGN PATENT DOCUMENTS

| JP | 06072145 A | * | 3/1994 |
| JP | 2002068786 A | * | 3/2002 |

* cited by examiner

*Primary Examiner*—Paul N. Dickson
*Assistant Examiner*—Laura B. Rosenberg
(74) *Attorney, Agent, or Firm*—Frank A. MacKenzie; Artz & Artz, P.C.

(57) ABSTRACT

An automotive side impact assembly 10 is provided. The automotive side impact assembly 10 includes a door assembly 18 having a door body portion 20 and a window opening portion 22. The door body portion 20 and said window opening portion 22 meet to form a beltline 24. A window assembly 26 is positioned within the window opening portion 22 and extends into the door body portion 20 when in a window closed condition 28. An automotive seat assembly 12 is positioned adjacent said door assembly 18. A side-impact air bag assembly 32 is positioned within the automobile 14 such that the side air-bag 32 is deployed between the door assembly 18 and the automotive seat 12. The side-impact air bag assembly 32 has a deployed condition in which a side air-bag 32 is deployed during a collision. A laminate assembly 40 is in communication with the window assembly 26 and has an upper laminate portion 42 extending above the beltline 24 into the window opening portion 22 when the window assembly 26 is in the window closed condition 28. The laminate assembly 40 has a lower laminate portion 44 extending below the beltline 24 into the door body portion 20 when the window assembly 26 is in the window closed position 28. The laminate assembly 40 provides structural rigidity to the window assembly 26 such that the side air-bag 32 is supported during deployment.

16 Claims, 2 Drawing Sheets

AUTOMOTIVE SIDE IMPACT PROTECTION

BACKGROUND OF INVENTION

The present invention relates generally to automotive side impact protection and more particularly to automotive side impact protection utilizing an improved window glass design.

Automotive design is charged with the ever-increasing development of new and improved methods of protecting occupants. The desire to expand the range of situations that both vehicle and occupants can withstand has driven the development of a plurality of accessories that may be implemented upon a vehicle. One such area of development has centered on the use of airbag devices. Air-bag assemblies commonly operate by way of sensors that register vehicle impacts. In response to impacts of sufficient force and direction, airbags are inflated between the occupant and surrounding vehicle structures in order to minimize occupant injuries.

The success of front air-bag assemblies has resulted in the expansion of the technology into more diverse applications. Side impact air-bags, for example, have been developed as one of a variety of responses to the desire to minimize injuries from side impact collisions. These air-bag systems are commonly mounted within the vehicle door structure or adjoining areas such that their inflation positions the bag between the occupant and the vehicle door. Various automotive designs and subsequent occupant position/vehicle relationships result in a variety of side air-bag storage and deployment positions. One unique configuration arises in vehicles incorporating relative high occupant seating. These vehicles, often SUVs or mini-vans, are configured such that the occupant's shoulders rise above the beltline (lower edge of the window).

An impact of many of these configured vehicles is that deployment of the side air-bag results in the air-bag being positioned between the occupant's shoulder and the vehicle side-window. Side air-bag deployment scenarios, however, often result in the damage or fracture of the vehicle side-window due to impact or even air-bag deployment. In such situations, the air bag may not be optimally supported on the window deployment side at positions above the beltline in plane with the occupant's shoulder. This, in turn, may impact the optimal effectiveness of the deployed air-bag.

Improvements in effectiveness of the side air-bag may, in turn, be addressed by modifications of system design and configuration. Air-bag size and deployment volume may be modified to increase efficiency. Seat and window configuration may be modified such that relative passenger position is lowered or relative window beltline is raised. These solutions, however, present a significant impact on cost and design constraints. In addition, these modifications may run counter to additional design considerations such as passenger/driver viewing angles and field of view requirements. It would, therefore, be highly desirable to have an improved side air-bag system configuration that provided an increase in air-bag efficiency without large scale vehicle redesign considerations.

SUMMARY OF INVENTION

It is, therefore, an object of the present invention to provide an automotive side impact assembly with increased efficiency. It is a further object of the present invention to provide an automotive side impact assembly that may be implemented at low cost.

In accordance with the objects of the present invention, an automotive side impact assembly is provided. The automotive side impact assembly includes a door assembly having a door body portion and a window opening portion. The door body portion and said window opening portion meet to form a beltline. A window assembly is positioned within the window opening portion and extends into the door body portion when in a window closed condition. An automotive seat assembly is positioned adjacent said door assembly. A side-impact air bag assembly is positioned within the automobile such that the side air-bag is deployed between the door assembly and the automotive seat. The side-impact air bag assembly has a deployed condition in which a side air-bag is deployed during a collision. A laminate assembly is in communication with the window assembly and has an upper portion extending above the beltline into the window opening portion when the window assembly is in the window closed condition. The laminate assembly has a lower laminate portion extending below the beltline into the door body portion when the window assembly is in the window closed position. The laminate assembly provides structural rigidity to the window assembly such that the side air-bag is supported during deployment.

Other objects and features of the present invention will become apparent when viewed in light of the detailed description of the preferred embodiment when taken in conjunction with the attached drawings and appended claims.

DETAILED DESCRIPTION

Figure 1:
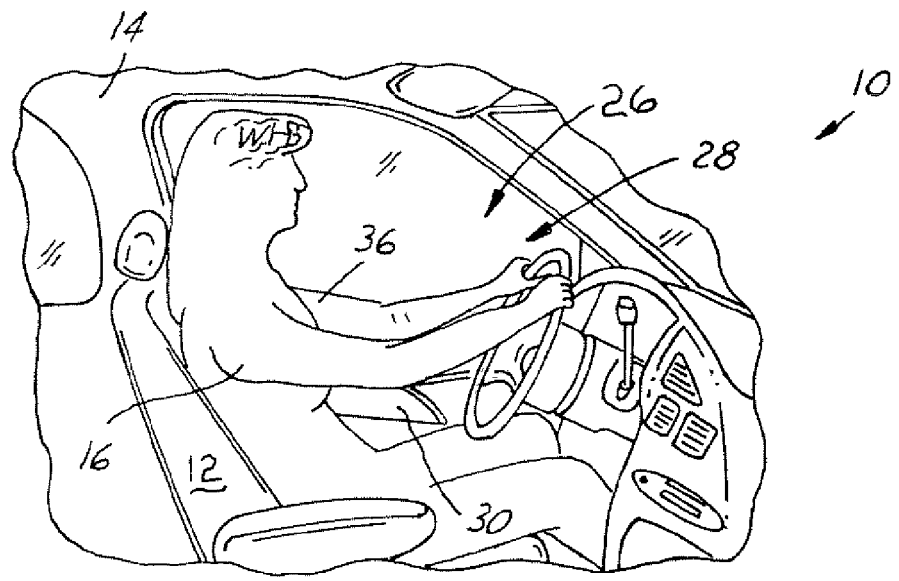
FIG. 1 is an illustration of an automotive side impact assembly in accordance with the present invention, the side impact air bag assembly shown in the pre-deployed condition.

Referring now to FIG. 1, which is an illustration of an automotive side impact assembly 10 in accordance with the present invention. The automotive side impact assembly 10 is intended to be utilized in a wide variety of vehicles for a wide variety of specific configurations. Although the present invention can be utilized on a variety of vehicles, it is preferably designed for vehicles in which a passenger's shoulder is positioned adjacent the vehicle windows above the beltline.

Figure 2:
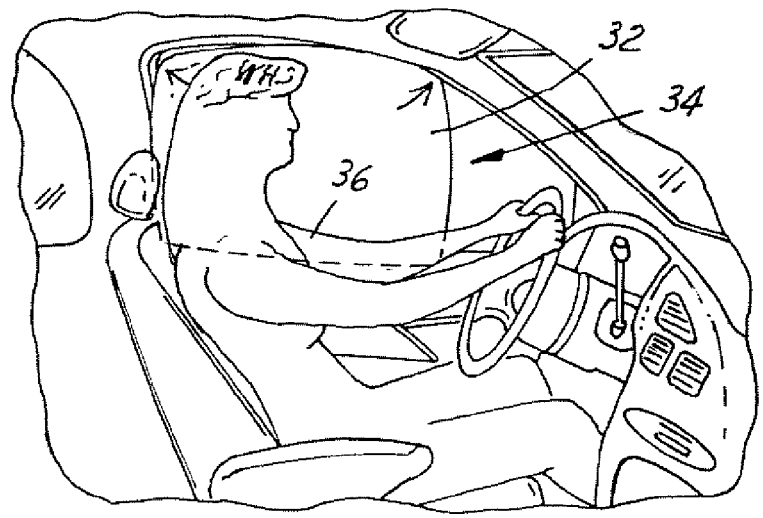
FIG. 2 is an illustration of the automotive side impact assembly illustrated in FIG. 1, the side impact air bag assembly illustrated in the deployed condition.
Figure 3:
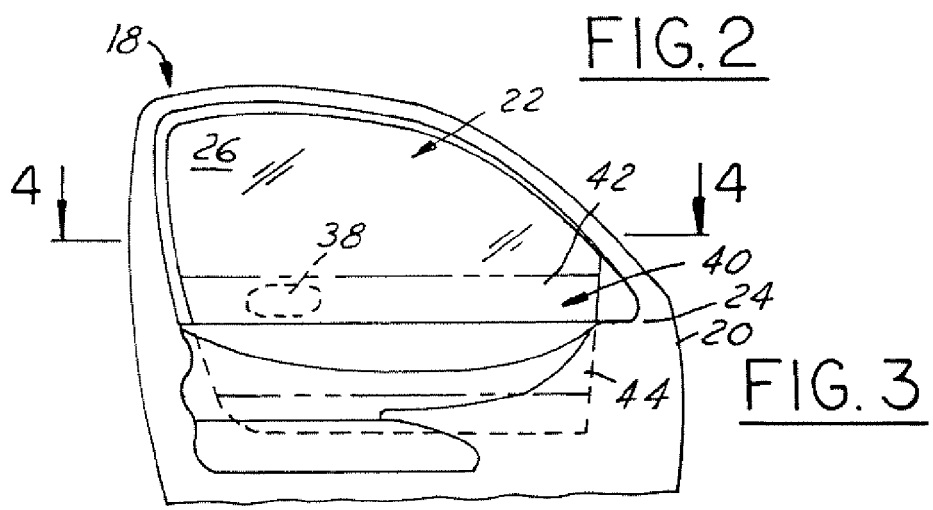
FIG. 3 is a detail illustration of the automotive side impact assembly illustrated in FIG. 1.

The automotive side impact assembly 10 further includes a side impact air bag assembly 30 positioned to deploy between the passenger 16 and the door assembly 18. It is contemplated that the side impact air bag assembly 30 may be positioned in numerous locations within the automobile 14, although one embodiment contemplates mounting it within the door body portion 20 of the door assembly 18. In this fashion, when in the event of a side impact collision, the side air bag 32 can be deployed into the deployed condition 34 (see FIG. 2). In the deployed condition 34, the side air bag 32 is preferably positioned between the passenger 16 and the door assembly 18. In automotive designs wherein the passenger's shoulder 36 is positioned above the beltline 24, this can generate an impact zone 38 on the window assembly 26 at a position corresponding to the passenger's shoulder 36 (see FIG. 3). The inflation of the side air bag 32 between the shoulder 36 and the impact zone 38 can create undue stresses in the window assembly 26 of existing arrangements. Damage to the window assembly 26 in such situations may reduce the effectiveness of the side air bag 32 by removing lateral support in window breakage situations.

The present invention provides a cost effective an efficient method of improving the effectiveness of the side air bag 32 during deployment. This is accomplished through the use of a laminate assembly 40 in communication with the window assembly 26. The laminate assembly 40 is applied to the window assembly 26 in order to improve the structural rigidity of the window assembly 26 in and around the impact zone 38. The use of an applied laminate assembly 40 is not only relatively inexpensive, but it additionally can be applied at any of a number of situations during manufacturing and assembly. This provides the ability for selective application which can further reduce costs (such as the application only in side air bag 32 installation in seat positions indicating shoulder 36 position likely above the beltline 24). A variety of laminate materials and application procedures may be utilized to apply the laminate assembly 40 to the widow assembly 26. It is preferable that the laminate assembly 40 be translucent in nature so as to minimize sight distortion through the window assembly 26. Similarly, it is contemplated that the laminate assembly 40 only extend upwards into the window assembly 26 from the beltline 24 in order to cover the impact zone 38, which may only require a quarter to half of the window assembly 26 height. This further minimizes sight distortion while maximizing structural rigidity of the window assembly 26.

Figure 4:
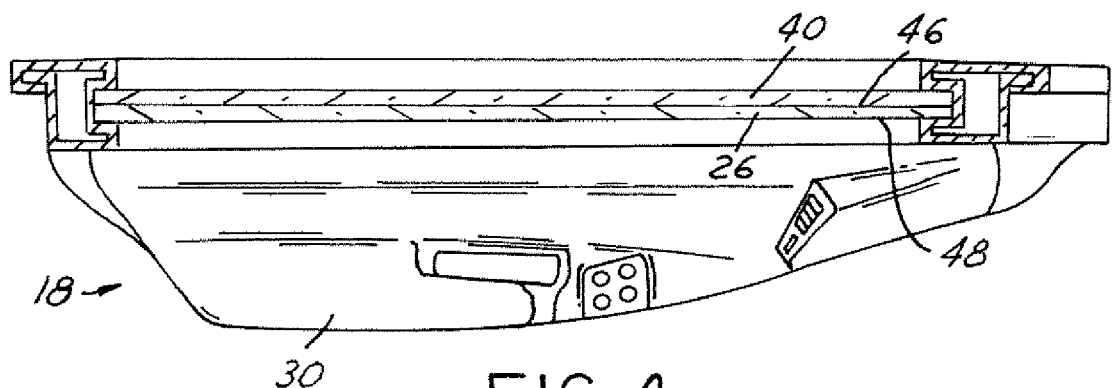
FIG. 4 is a cross-sectional illustration of an embodiment of the automotive side impact assembly illustrated in FIG. 3, the illustration taken along the lines 4—4 in the direction of the arrows.
Figure 5:
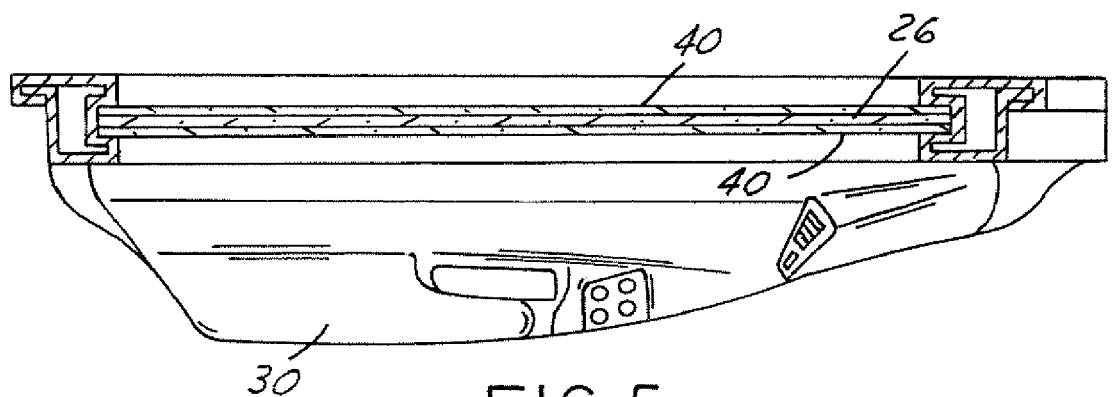
FIG. 5 is a cross-sectional illustration of an alternate embodiment of the automotive side impact assembly illustrated in FIG. 4.

The laminate assembly 40 is contemplated to have an upper laminate portion 42 extending above the beltline 24 into the window opening portion 22 and a lower laminate portion 44 extending below the beltline 24 into the door body portion 20. This further improves the structural rigidity of the window assembly 26 within the impact zone 38 by utilizing the door body portion 20 for added strength (see FIG. 3). It is contemplated that the laminate assembly 40 may be applied to the outside surface 46 of the window assembly 26 (see FIG. 4), the interior surface 48 of the window assembly 26 (see FIG. 6), or both (see FIG. 5). This provides for a broader range of laminate assemblies 40 that can be utilized for their structural rigidity properties or their viewing properties.

Figure 6:
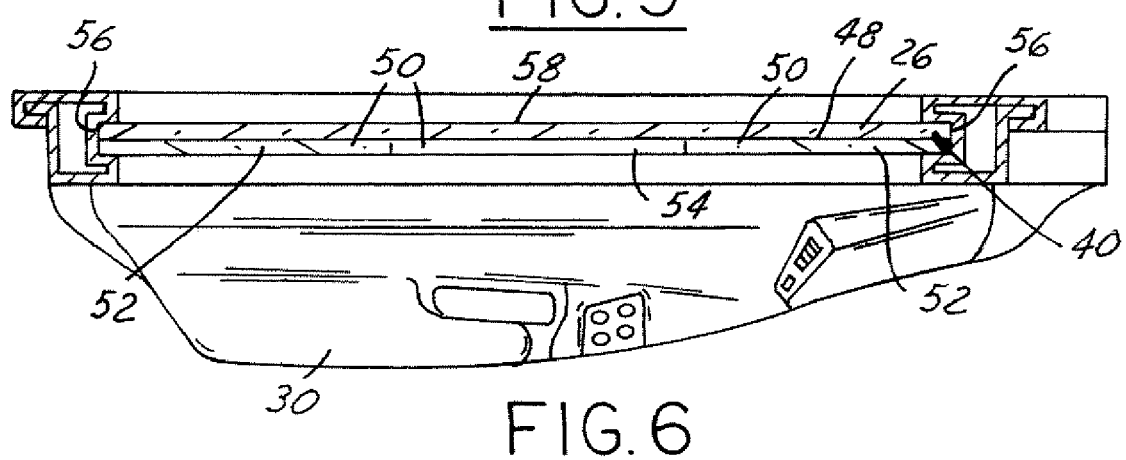
FIG. 6 is a cross-sectional illustration of an alternate embodiment of the automotive side impact assembly illustrated in FIG. 4.
Figure 7:
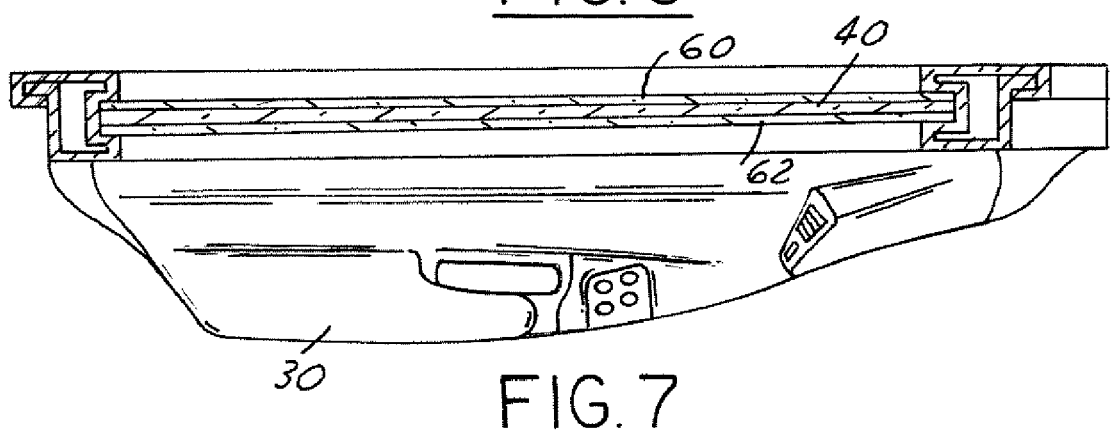
FIG. 7 is a cross-sectional illustration of an alternate embodiment of the automotive side impact assembly illustrated in FIG. 4.

It is further contemplated that the laminate assembly 40 may be comprised of a variety of laminate portions 50 used in combination to provide the best combination of structural improvement and minimal view impact. As shown in FIG. 6, a first laminate portion 52 can be used in combination with a second laminate portion 54 to generate a unique profile. The first and second laminate portions 52,54 have a respective first and second laminate strengths. This allows a tailored approach to structural improvement. Additional strength can be generated by applying the first laminate portion 52 bordering the window side edges 56. A reduced view distortion can be generated by positioning the second laminate portion 54, having improved translucence, in the window center 58. In this fashion a tailored strength/view characteristics can be generated. Although only two laminate portions 52,54 have been described, it should be understood that the present invention can be used with any number of individual laminate portions.

In a unique embodiment, it is contemplated that the laminate assembly 40 may be manufactured between a first window pane section 60 and a second window pane section 62. This allows the laminate assembly 40 to be protected from scratches or damage during usage. It may additionally provide for a broader range of laminate materials as the window assembly 26 servers as a protection buffer for the laminate assembly 40. The laminate assembly 40 manufactured between the window pane sections 60, 62 can again be of any of a variety of materials and may also consist of any number of laminate portions. In this way a broad range of structural rigidity characteristics can be imparted to the window assembly 26 without adversely increasing view distortion.

While particular embodiments of the invention have been shown and described, numerous variations and alternative embodiments will occur to those skilled in the art. Accordingly, it is intended that the invention be limited only in terms of the appended claims.

The invention claimed is:

1. An automotive side impact assembly comprising:
   a door assembly including a door body portion and a window opening portion, said door body portion and said window opening portion meeting to form a beltline;
   a window assembly positioned within said window opening portion and extending into said door body portion when in a window closed condition;
   an automotive seat assembly positioned adjacent said door assembly;
   a side-impact air bag assembly having a deployed condition in which a side air-bag is deployed during a collision, said side-impact air-bag assembly positioned within the automobile such that said side air-bag is deployed between said door assembly and said automotive seat,
   a laminate assembly in communication with said window assembly, said laminate assembly having an upper laminate portion extending above said beltline into said window opening portion when said window assembly is in said window closed condition, said laminate assembly having a lower laminate portion extending below said beltline into said door body portion when said window assembly is in said window closed position, said laminate assembly providing structural rigidity to said window assembly such that said side air-bag is supported during deployment,
   wherein said laminate assembly comprises a first laminate portion having first laminate strength and a second laminate portion having a second laminate strength, and
   wherein said first laminate portion comprises a perimeter laminate positioned along said beltline at a window side edge; and said second laminate portion comprises a center laminate positioned along said beltline at a window center.

2. An automotive side impact assembly as described in claim 1, wherein said laminate assembly is applied on an exterior surface of said window assembly.

3. An automotive side impact assembly as described in claim 1, wherein said laminate assembly is applied on an interior surface of said window assembly.

4. An automotive side impact assembly as described in claim 1, wherein said window assembly comprises:
   a first window pane section; and
   a second window pane section, said laminate assembly positioned between said first window pane section and said second window pain section.

5. An automotive side impact assembly as described in claim 1, wherein said laminate assembly is translucent.

6. An automotive side impact assembly as described in claim 1, wherein said side-impact air bag assembly is positioned within said door body portion.

7. An automotive side impact assembly as described in claim 1, wherein said automotive seat assembly is positioned relative to said window assembly such tat a shoulder of a passenger positioned within said automotive seat assembly rises above said beltline.

8. An automotive side impact assembly comprising:
   a door assembly including a door body portion and a window opening portion, said door body portion and said window opening portion meeting to form a beltline;
   a window assembly positioned within said window opening portion and extending into said door body portion when in a window closed condition;
   an automotive seat assembly positioned adjacent said door assembly, said automotive seat assembly positioned such that an impact zone is defined between a shoulder of a passenger seated in said automotive seat assembly and said window assembly;
   a side-impact air bag assembly having a deployed condition in which a side air-bag is deployed during a collision, said side-impact air-bag assembly positioned within the automobile such that said side air-bag is deployed partially between said impact zone and said shoulder, and a laminate assembly in communication with said window assembly, said laminate assembly having an upper laminate portion extending above said beltline into said impact zone when said window assembly is in said window closed condition, said laminate assembly providing structural rigidity to said window assembly in the region of said impact zone such that said side air-bag is supported during deployment,
   wherein said laminate assembly comprises a first laminate portion having a first laminate strength and a second laminate portion having a second laminate strength, and
   wherein said first laminate portion comprises a perimeter laminate positioned along said beltline at a window side edge; and said second laminate portion comprises a center laminate positional along said beltline at a window center.

9. An automotive side impact assembly as described in claim 8, wherein said laminate assembly includes a lower laminate portion extending below said beltline into said door body portion when said window assembly is in said window closed position.

10. An automotive side impact assembly as described in claim 8, wherein said laminate assembly is applied on an exterior surface of said window assembly.

11. An automotive side impact assembly as described in claim 10, wherein said laminate assembly is further applied on an interior surface of said window assembly.

12. An automotive side impact assembly as described in claim 8, wherein said window assembly comprises:
   a first window pane section; and
   a second window pane section, said laminate assembly positioned between said first window pane section and said second window pane section.

13. An automotive side impact assembly as described in claim 8, wherein said laminate assembly is translucent.

14. An automotive side impact assembly as described in claim 8, wherein said side-impact air bag assembly is positioned within said door body portion.

15. A method of improving an automotive side impact assembly comprising:
   identifying an impact zone on an automotive window assembly caused by a deployed side impact air bag assembly by determining a shoulder position of a passenger above a beltline of said automotive window assembly;
   reinforcing said automotive window assembly by applying a structurally reinforcing laminate assembly to said automotive window assembly in said impact zone.

16. A method of improving an automotive side impact assembly as described in claim 15, further comprising:
   applying said structurally reinforcing laminate assembly such that said laminate assembly has an upper laminate portion extending above said beltline into a window opening position when said window assembly is in a window closed condition and said laminate assembly has a lower laminate portion extending below said beltline into a door body portion when said window assembly is in a window closed position.

\* \* \* \* \*